US006571616B1

(12) United States Patent
Tsukamoto et al.

(10) Patent No.: US 6,571,616 B1
(45) Date of Patent: Jun. 3, 2003

(54) EASY METHOD FOR MEASURING BRAKE MEAN EFFECTIVE PRESSURE IN A RUNNING VEHICLE

(75) Inventors: Tokihiro Tsukamoto, Miyanohigashi-machi (JP); Koichi Matsumoto, Miyanohigashi-machi (JP); Shigeo Nakamura, Miyanohigashi-machi (JP); Nobutaka Kihara, Miyanohigashi-machi (JP)

(73) Assignee: Horiba, Ltd, Miyanohigashi-Machi (JP)

(*) Notice: Subject to any disclaimer, the term of this patent is extended or adjusted under 35 U.S.C. 154(b) by 0 days.

(21) Appl. No.: 09/572,354

(22) Filed: May 17, 2000

(30) Foreign Application Priority Data

May 21, 1999 (JP) .......................................... 11-142282

(51) Int. Cl.[7] .................................................. G01L 5/28
(52) U.S. Cl. ........................................................ 73/121
(58) Field of Search ........................... 73/121, 129, 116, 73/118.1, 117, 117.2, 117.3; 123/478, 425

(56) References Cited

U.S. PATENT DOCUMENTS 4,964,318 A * 10/1990 Ganoung .................... 123/478
5,284,116 A * 2/1994 Richeson, Jr. ............. 123/425

* cited by examiner

*Primary Examiner*—Eric S. McCall
*Assistant Examiner*—Maurice Stevens
(74) *Attorney, Agent, or Firm*—Oppenheimer Wolff & Donnelly

(57) ABSTRACT

The present invention provides a method for easily measuring a brake mean effective pressure of a running vehicle. An air flow sensor, a λ sensor and a data collecting apparatus are mounted to the vehicle. A running speed and engine speed from the vehicle while actually running on a road surface, and output of the air flow sensor an the λ sensor are inputted to the data collecting apparatus. Specific fuel consumption is obtained from an intake air amount and ratio of excessive air in exhaust gas. Output of an engine is obtained from a relation between the specific fuel consumption and the engine speed.

10 Claims, 7 Drawing Sheets

BRAKE MEAN EFFECTIVE PRESSURE
Pe=.2368x Q-1.3631

RUNNING ON EXPRESSWAY

VEHICLE SPEED, ENGINE POWER
AND MOTIVE POWER

RUNNING AT HIGH SPEED
(DOWNHILL RUNNING)
AVERAGE VEHICLE SPEED 57.2 km/h

EASY METHOD FOR MEASURING BRAKE MEAN EFFECTIVE PRESSURE IN A RUNNING VEHICLE

FIELD OF THE INVENTION

The present invention relates to a method for easily measuring a brake mean effective pressure of a vehicle such as an automobile actually running on a road.

DESCRIPTION OF PRIOR ART

Generally, a brake mean effective pressure is used as an index indicative of engine performance of an automobile. Although the brake mean effective pressure has a unit of pressure, it can be considered as a torque per engine displacement.

For example, a motive force F represented by the following equation (1):

$$F=A+BV^2+m\alpha+mg\theta \quad (1)$$

wherein

A: rolling resistance $BV^2$: (aerodynamic drag)

$$B=C_D \times S \times \gamma_a/g$$

$C_D$: drag coefficient, S: maximum vehicle cross-section, $\gamma_a$: specific weight of air, g: gravitational acceleration of gravity, V: vehicle speed m: vehicle weight, a: acceleration of vehicle, θ: gradient angle Of the above values, A and B can be determined by a coast down method, and V and ∝ can be determined by a vehicle speed sensor. In the case of the coast down method, a gearshift lever is placed into neutral at a certain speed on a flat road and the vehicle is allowed to coast (coasting running) while the values of A and B are obtained from the deceleration. That is, in the above equation (1), F=O, θ=0, and $-m\propto=A+BV^2$.

However, in the case of a vehicle running on a road, it is difficult to obtain the gradient of the road precisely and, thus it is difficult to obtain the Road Load (RL) and motive power in all road conditions. It is conventional method to mount a torque sensor to an axle shaft or a driving wheel to obtain the RL of an automobile. However, the torque sensor may project from a car body, and its durability may not be sufficient. Furthermore, the torque sensor is not suitable for running on an ordinary road. Therefore, such a sensor is used mainly for measuring procedures on a test course, and the sensor can not be used for measurement on an ordinary road.

SUMMARY OF THE INVENTION

The present invention has been accomplished in view of the above circumstances, and it is an object of the invention to provide a method for easily measuring a brake mean effective pressure of a running vehicle.

To achieve the above object, an air flow sensor, a λ sensor and a data collecting apparatus are mounted to a vehicle. The running speed (Km/R) and engine speed (rpm) of the vehicle while actually running on a road surface, and output of the air flow sensor and the λ sensor are inputted into the data collecting apparatus. A specific fuel consumption is obtained from an intake air amount and ratio of excessive air in exhaust gas. The output of an engine is obtained from a relation between the specific fuel consumption and engine speed.

DETAILED DESCRIPTION OF THE PREFERRED EMBODIMENTS

Figure 1:
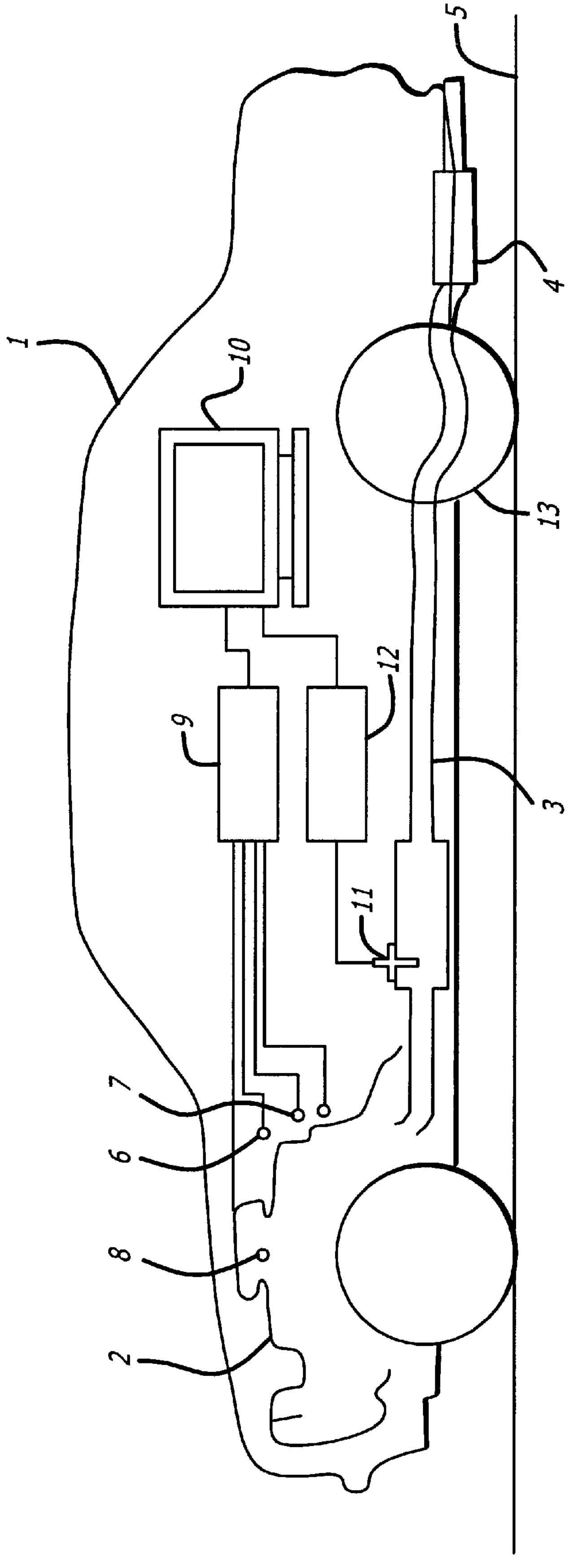
FIG. 1 shows configurations explaining a method for easily measuring brake mean effective pressure in accordance with the present invention.

FIG. 1 shows configurations of a method for easily measuring a brake mean effective pressure in accordance with the present invention. In FIG. 1, the reference number 1 represents a vehicle under test. In the exemplary embodiment, the vehicle 1 is a diesel passenger vehicle in which a diesel engine (simply engine, hereinafter) 2 is mounted. Reference number 3 represents an exhaust pipe connected to the engine 2, and reference number 4 represents a muffler provided on the exhaust pipe 3. Reference number 5 represents a road surface.

Reference numbers 6 and 7 represent an engine speed sensor and a vehicle speed sensor, respectively. Reference number 8 represents an air flow sensor (AFS) such as a Kalman flow meter. The AFS 8 is located in an air cleaner (not shown) which is provided in the vicinity of the engine 2. The output of these sensors 6, 7 and the intake air flowmeter 8 are inputted to a microcomputer 10 through an interface 9. The microcomputer 10 is mounted in the vehicle 1 and includes data collecting function, computation function, and function for storing and outputting the computation result.

Although it is not illustrated, sensors for measuring intake air temperature, intake air humidity and atmospheric pressure are provided in the vicinity of the air flow sensor 8. The output of these sensors are also inputted to the microcomputer 10 through the interface 9. Reference number 11 represents a λ sensor (commercially available) attached to the exhaust pipe 3 for measuring a ratio of excessive air, and its output is inputted to the microcomputer 10 through an interface 12. Reference number 13 represents a driving wheel tire.

Next, with reference to FIG. 2 and subsequent FIGS. 3–7, a method for a measuring a brake mean effective pressure when the diesel passenger vehicle having the above structure is allowed to run on a road will be explained. The method will be explained separately for a case where a chassis dynamometer can be used and for a case where the chassis dynamometer can not be used.

1. When the Chassis Dynamometer can be used:

The chassis dynamometer generally includes a function capable of simulating climbing resistance. If the vehicle 1 is allowed to run normally using this function while changing the vehicle speed and gear ratio of the transmission at various gradients, it is possible to obtain wide range data relating to the engine speed and engine power.

A method for obtaining the engine power from a motive force F obtained by the chassis dynamometer will be explained.

First, between a torque T of the tire 13 and an effective diameter D, there is a relation as shown in the following equation (2):

$$T=F\times D/2 \quad (2)$$

Further, between a motive power $P_t$ of the tire 13 and the tire speed $T_{rpm}$, there is a relation as shown in the following equation (3):

$$P_t=k_1\times T\times T_{rpm} \quad (3)$$

wherein $k_1$ is a horsepower conversion coefficient.

Between the revolution rate $T_{rpm}$ of the tire 13, vehicle speed V and the effective diameter D of the tire 13, there is a relation as shown in the following equation (4):

$$T_{rpm}=V/\pi D \quad (4)$$

From the above equations (2) to (4), a relation can be obtained as shown in the following equation (5):

$$P_t=k_1\times F\times V/2\pi \quad (5)$$

If a torque transmitting efficiency from the engine 2 to the tire 13 is defined as $\eta$, an output $P_{eng}$ of the engine 2 can be represented by the following equation (6):

$$P_{eng}=P_t/\eta \quad (6)$$

As described above, the brake mean effective pressure Pe is used as the index representing the performance of the engine 2. Although the brake mean effective pressure has a unit of pressure, this can be considered as the torque per displacement of the engine 2. Between an engine displacement amount Vh and the engine revolution speed rp, there is a relation as shown in the following equation (7):

$$Pe=k_2\times P_{eng}/(Vh\times rp)=k_3\times T/Vh \quad (7)$$

Figure 2:
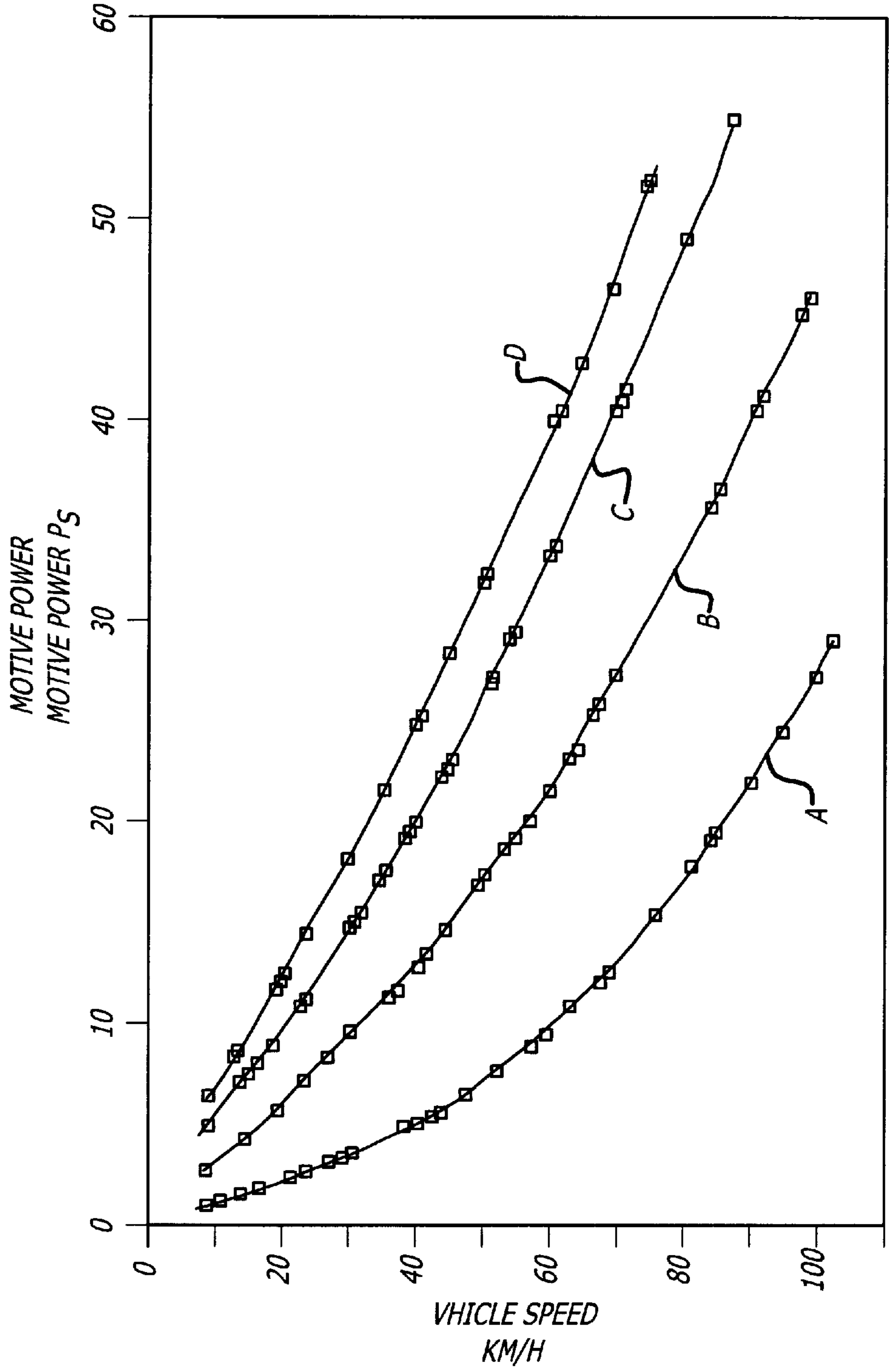
FIG. 2 shows a relation between vehicle speed and motive power when a gradient angle is varied.
Figure 3:
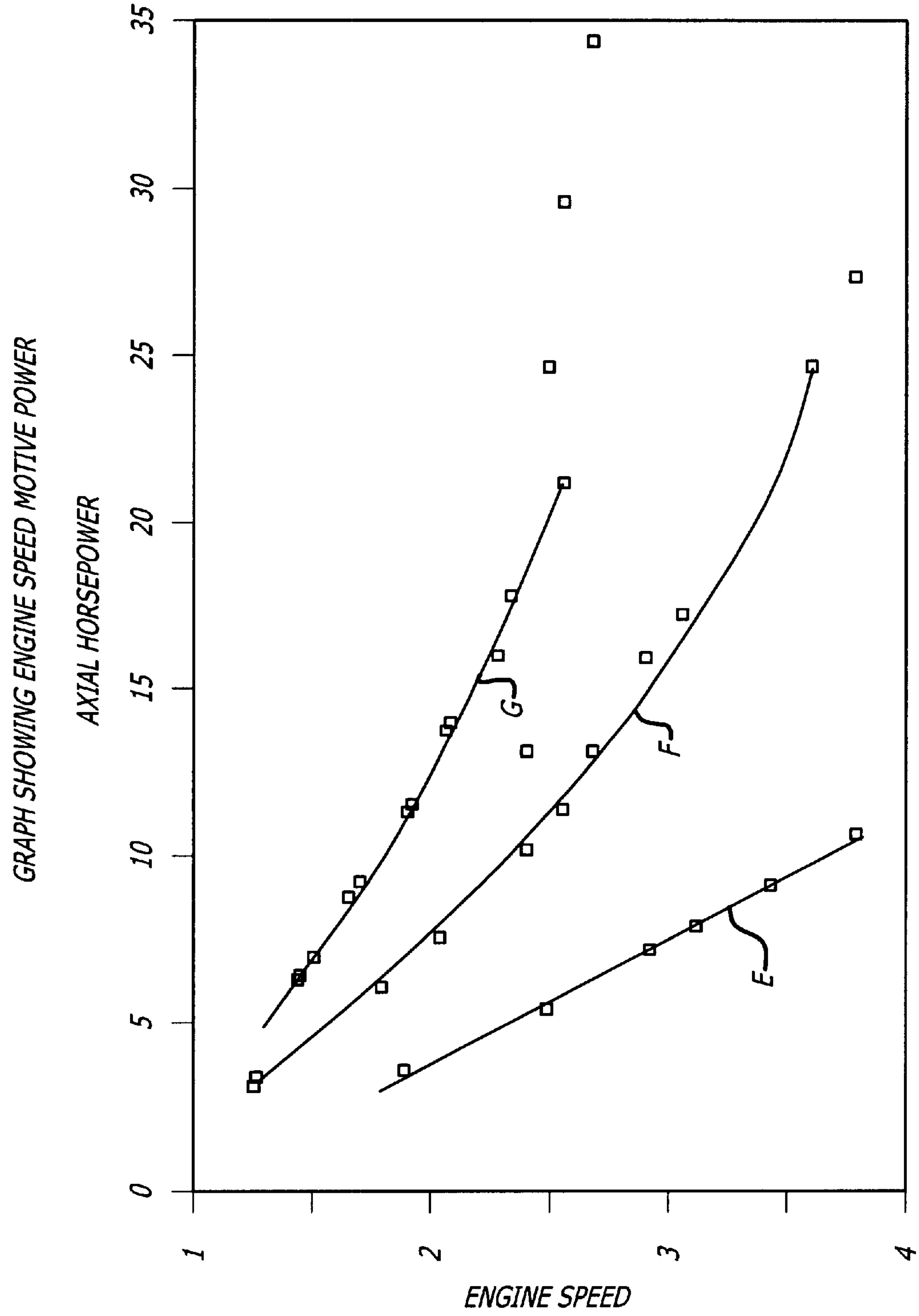
FIG. 3 shows a relation between engine speed and motive power when a gradient angle is varied.

FIGS. 2 and 3 show the above described relation obtained by the diesel passenger vehicle 1, and FIG. 2 shows the relation between vehicle speed and motive power when the gradient of the road surface 5 is changed. Curves A, B, C and D are obtained by plotting data when the gradient of the road surface is 0°, 2°, 4°, and 5°, respectively. FIG. 3 shows the relation between the engine speed and motive power when the gradient of the road surface 5 is changed. Curves E, F and G are obtained by plotting data when the gradient of the road surface is 0°, 2°, and 5°, respectively.

Next, a calculating method for obtaining the fuel consumption ratio based on the detection output of the AFS 8 provided in the vicinity of the engine 2 and the detection output of the λ sensor 11 provided in the exhaust pipe 3 will be explained.

Between the air excessive ratio λ and air/fuel ratio $T_{AFR}$ at the time of the measurement, the following equation (8) is established:

$$\lambda=T_{AFR}/\text{theoretical air/fuel ratio} \quad (8)$$

The theoretical air/fuel ratio is 14.7 in the case of light oil. The air excessive ratio λ is obtained by measuring the oxygen concentration in the exhaust gas, which is obtained by the λ sensor 11 provided in the exhaust pipe 3. Further, since the air/fuel ratio $T_{AFR}$ is a ratio of the dry air weight and the consumption fuel weight, the dry air weight is obtained by the atmospheric pressure, the intake air temperature and the intake air humidity measured simultaneously when the intake air flow rate is measured. The obtained value is divided by the air/fuel ratio $T_{AFR}$, and this corresponds to the consumption fuel weight. From this value, a fuel supply weight q per one cylinder and one cycle is obtained.

That is, when the fuel consumption amount is G(g/min), the number of cylinders is n, and the engine revolution speed is rp(rpm), the following equation (9) is established:

$$q=i\times G\times 1000/(n\times rp)\ (\text{mm}^3/St) \quad (9)$$

wherein i is 1 in the case of a two-cycle engine, or is 2 in the case of a four-cycle engine.

Figure 4:
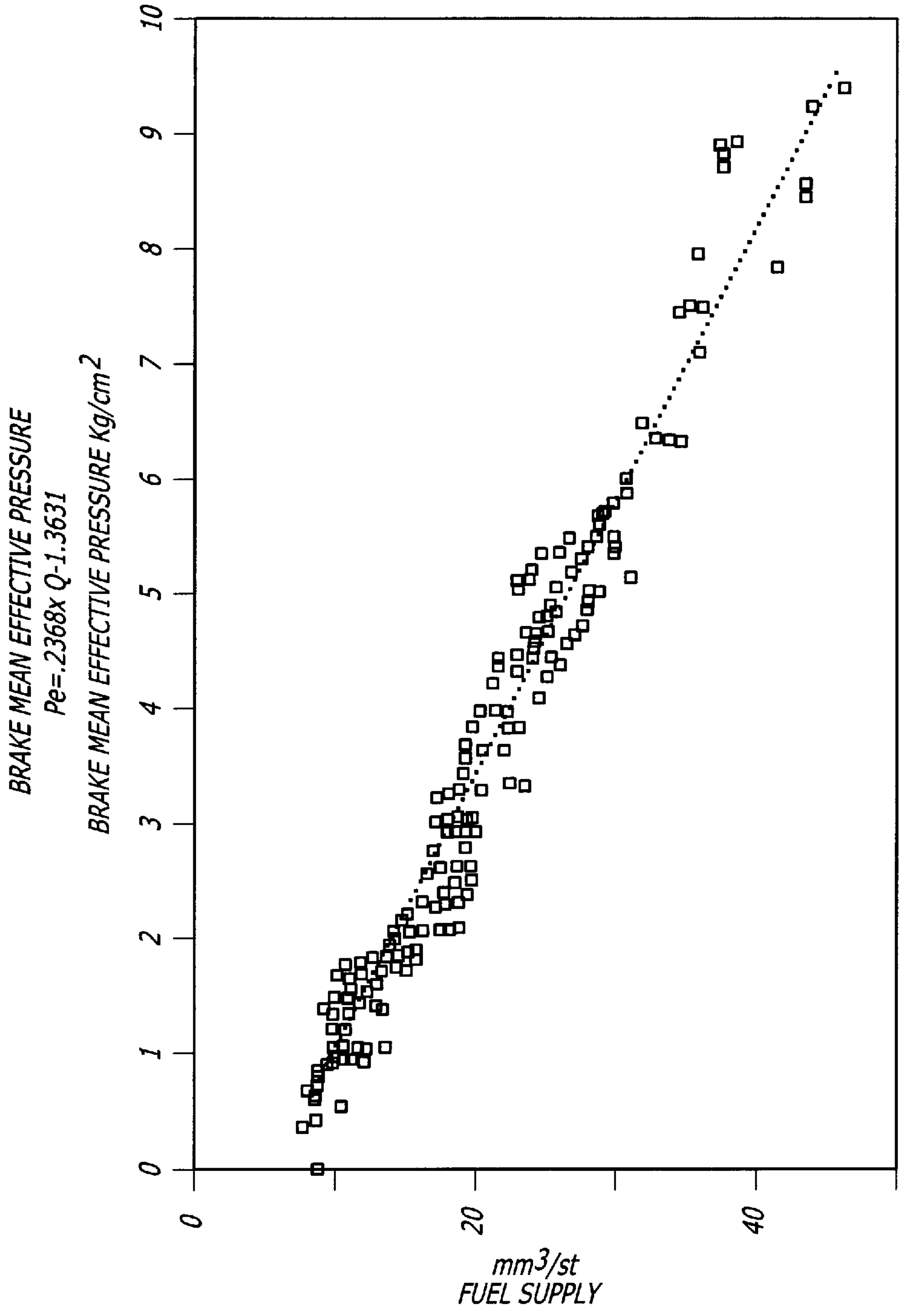
FIG. 4 shows a relation between fuel supply and brake mean effective pressure.

FIG. 4 shows a relation between the fuel supply weight q and the brake mean effective pressure Pe. In FIG. 4, it is considered that the reasons why the variation width is great is that the diesel passenger vehicle 1 used in the test is an AT (automatic transmission) vehicle, and the transmitting efficiency $\eta$ is varied by the vehicle speed V, the engine revolution speed rpm and the load.

Figure 5:
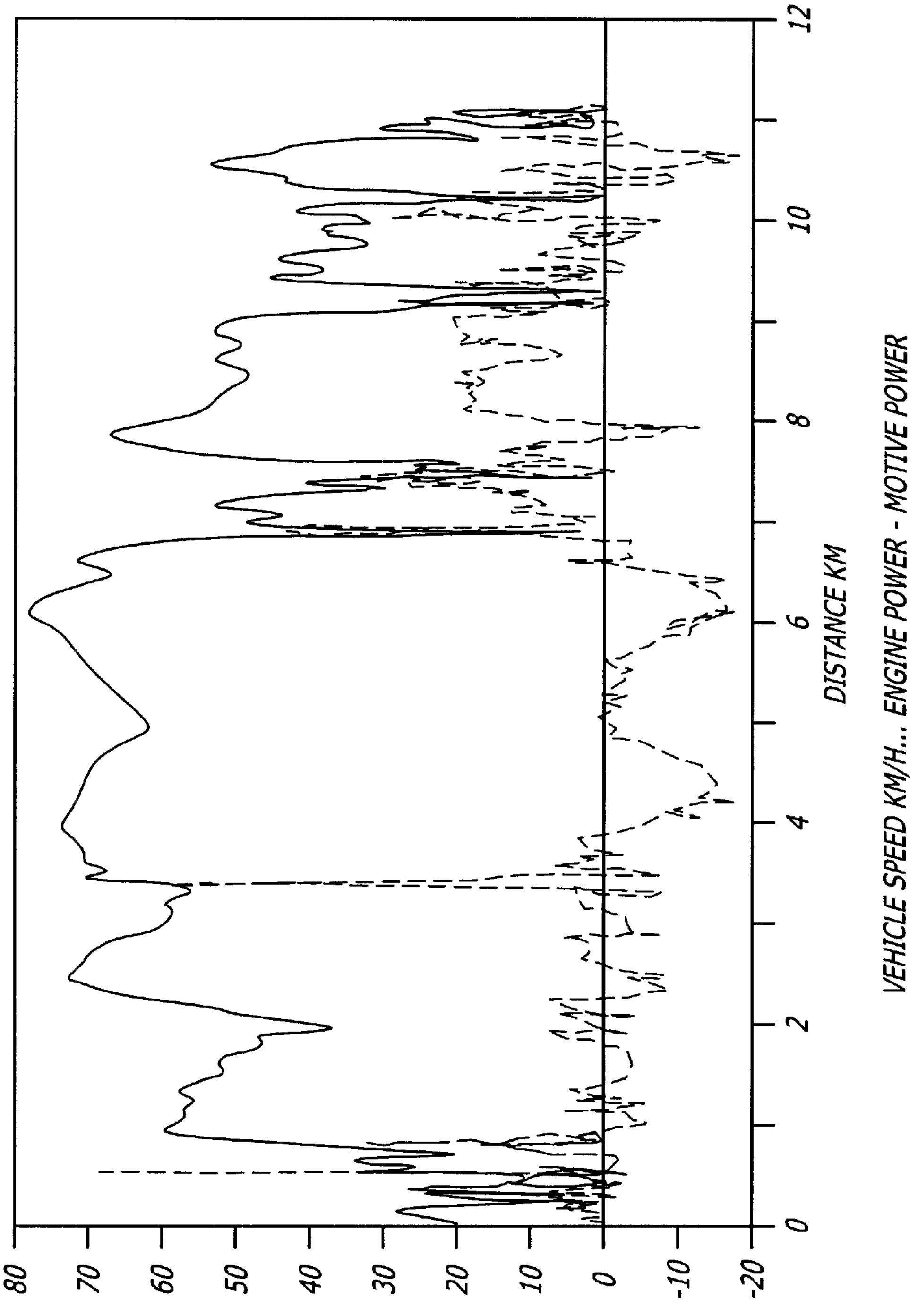
FIG. 5 shows a relation between engine power $P_{eng}$ obtained from fuel consumption and motive power on a flat road obtained by a vehicle speed meter, and data obtained when the vehicle runs uphill.
Figure 6:
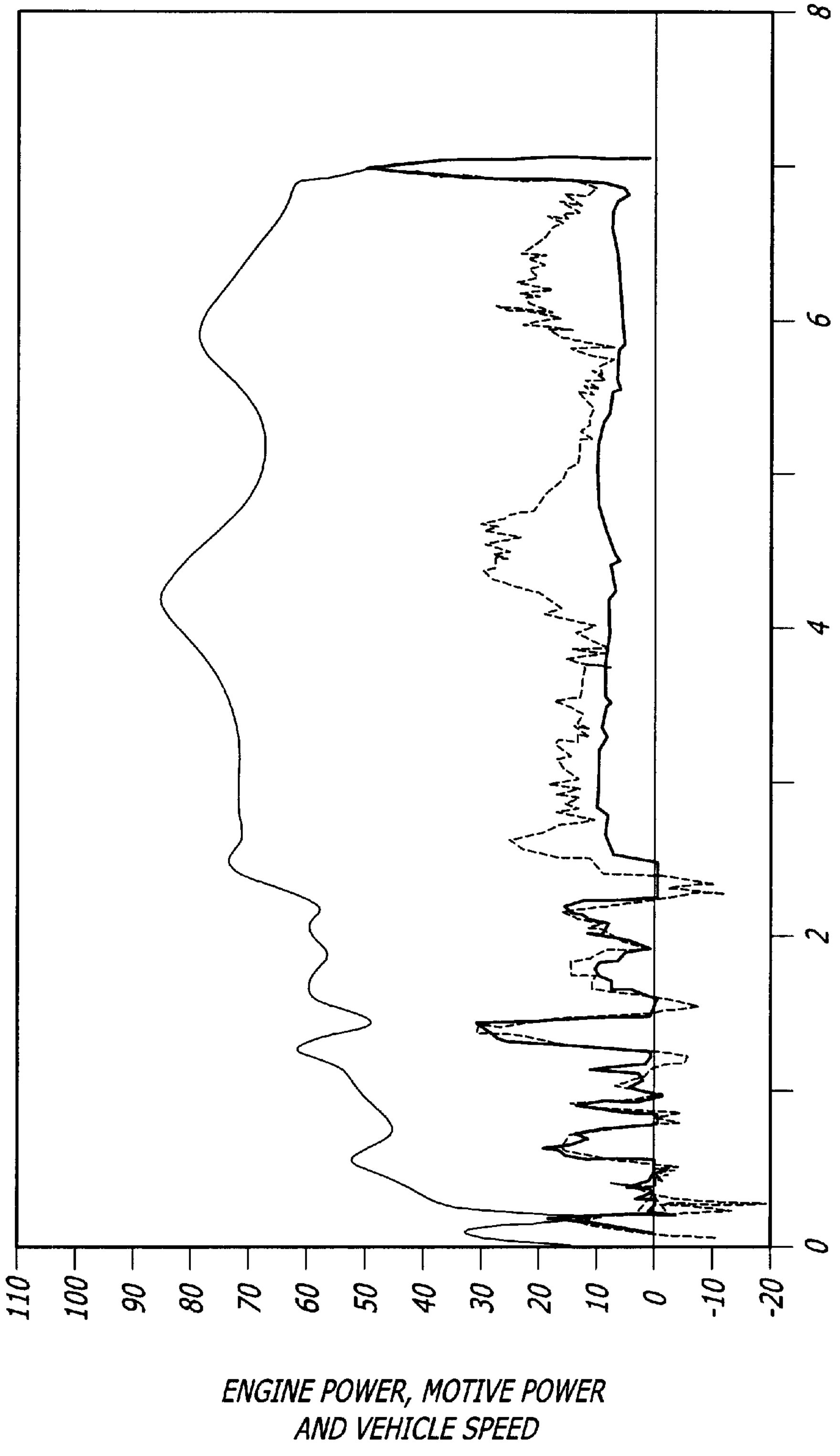
FIG. 6 shows a relation between engine power $P_{eng}$ obtained from fuel consumption and motive power on the flat road obtained by the vehicle speed meter, and data obtained when the vehicle runs downhill.

The brake mean effective pressure Pe is obtained from the relation between the fuel supply weight q and the brake mean effective pressure Pe. The engine output $P_{eng}$ can be obtained by substituting the Pe value into equation (7). FIGS. 5 and 6 show a relation of the engine power $P_{eng}$ obtained from fuel consumption and motive power on a flat road obtained from a vehicle speed meter. FIG. 5 shows data obtained at the time of uphill running, and FIG. 6 shows data obtained at the time of downhill running.

2. When the Chassis Dynamometer can not be used:

At the present time, the availability of chassis dynamometers for large-sized cars is limited, and it is difficult to test a load using chassis dynamometers for large-sized cars. Thereupon, on a flat road, if the speed is accelerated in each of the gears while keeping the accelerator opening degree constant, it is possible to obtain the relation between engine revolution speed rpm and brake mean effective pressure Pe in a wide range.

That is, a running resistance is obtained by the first three terms on the right side of equation (1). i.e., $A+BV^2+m\alpha$. Also, if the test is carried out while varying the carrying capacity, it is possible to increase the measuring points.

In this case also, the method for obtaining the relation between q and Pe is the same as that when the chassis dynamometer can be used.

Figure 7:
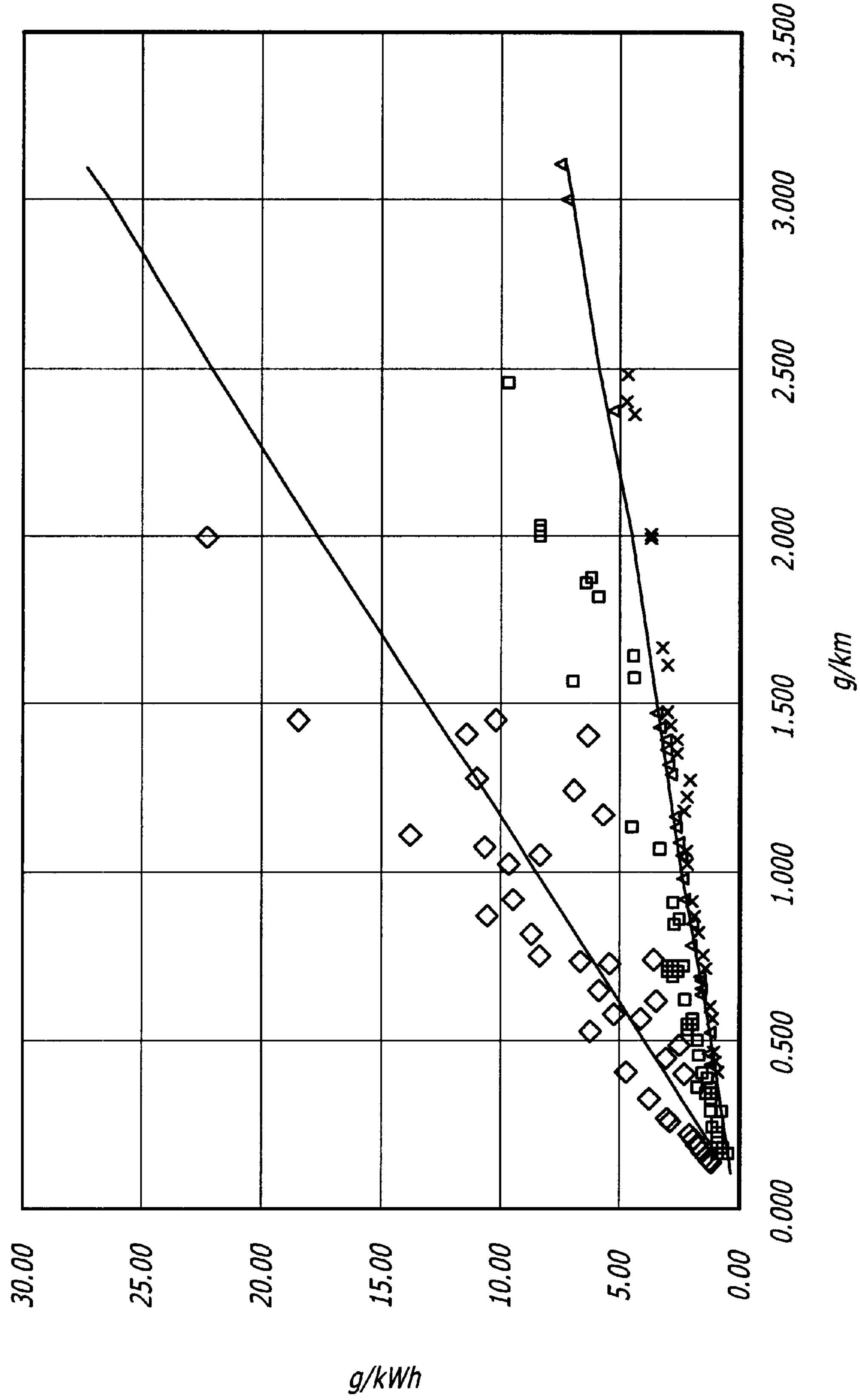
FIG. 7 shows one example of a relation between g/km of harmful emission in a diesel passenger vehicle and restrictive g/kWh of a large-sized car.

A relation between g/km of the harmful discharge and restrictive g/kWh can be obtained from the above data. FIG. 7 shows actual measured data of the diesel passenger vehicle.

Although the diesel passenger vehicle is used as an example in the above-described embodiment, the present invention can also be applied for a gasoline powered vehicle.

As explained above, in the present invention, an intake or exhaust or air flow sensor, a λ sensor and a data collecting apparatus are mounted to a vehicle. Running speed and engine speed of the vehicle while actually running on a road surface, and output of the intake or exhaust air flow sensor and theλ sensor are inputted to the data collecting apparatus. Specific fuel consumption is obtained from an intake air amount and ratio of excessive air in exhaust gas. Output of an engine is obtained from a relation between the specific fuel consumption and the engine speed. Therefore, it is possible to easily measure the brake mean effective pressure of the running vehicle.

What is claimed is:

1. A method of easily measuring a brake mean effective pressure of a running vehicle using a chassis dynamometer, comprising the steps of:

measuring an intake air amount with a flow meter;

measuring a ratio of excessive air with a λ sensor;

measuring an intake air temperature with an intake air temperature sensor;

measuring an intake air humidity with an intake air humidity sensor;

measuring an intake air atmospheric pressure with an intake air atmospheric pressure sensor;

calculating a specific fuel consumption based on the intake air amount and the ratio of excessive air;

calculating an output of an engine based on a relation between the specific fuel consumption and an engine revolution number, the engine revolution number received from an engine revolution sensor;

calculating a fuel supply weight based on an measurement from said flow meter, said intake air atmospheric pressure sensor, an engine speed sensor, and a vehicle speed sensor; and extrapolating a brake mean effective pressure from a characteristic curve based on said calculated fuel supply weight.

2. The method of claim 1, further comprising mounting the flow meter, the λ sensor, the intake air temperature sensor, the intake air humidity sensor, and intake air atmospheric pressure sensor to the vehicle.

3. The method of claim 1, wherein the ratio of excessive air is obtained by using the λ sensor to measure the oxygen concentration in an exhaust gas.

4. The method of claim 1, further comprising:

wherein the ratio of excessive air is the ratio of dry air weight and a consumption fuel weight; and obtaining the dry air weight by simultaneously measuring the intake air atmospheric pressure, intake air temperature, and intake air humidity when the intake air flow amount is measured.

5. The method of claim 1, further comprising:

obtaining a relation of engine output on a flat road as a function of fuel consumption and motive power;

obtaining a relation of engine output as a function of fuel consumption and motive power while running uphill; and obtaining a relation of engine output as a function of fuel consumption and motive power while running downhill.

6. The method of claim 1, wherein the flow meter is a Kalman flowmeter.

7. The method of claim 1 further comprising:

inputting an output of the flow meter and the λ sensor into a data collecting apparatus, wherein the data collecting apparatus is a microcomputer.

8. The method of claim 7, further comprising:

using the microcomputer to compute a computation result based on data obtained from the data collecting apparatus;

storing the computation result; and outputting the computation result.

9. The method of claim 1, wherein the engine is a two-cycle engine.

10. The method of claim 1, wherein the engine is a four-cycle engine.

* * * * *